(12) United States Patent
Eriksson

(10) Patent No.: US 11,015,487 B2
(45) Date of Patent: May 25, 2021

(54) CLAMP

(71) Applicant: VOLVO TRUCK CORPORATION, Gothenburg (SE)

(72) Inventor: Pontus Eriksson, Helsingborg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 545 days.

(21) Appl. No.: 15/748,391

(22) PCT Filed: Sep. 9, 2015

(86) PCT No.: PCT/EP2015/070563
§ 371 (c)(1),
(2) Date: Jan. 29, 2018

(87) PCT Pub. No.: WO2017/041836
PCT Pub. Date: Mar. 16, 2017

(65) Prior Publication Data
US 2018/0223692 A1    Aug. 9, 2018

(51) Int. Cl.
*F01D 25/26* (2006.01)
*F02M 35/10* (2006.01)
(Continued)

(52) U.S. Cl.
CPC .......... *F01D 25/265* (2013.01); *F01D 25/24* (2013.01); *F02C 6/12* (2013.01);
(Continued)

(58) Field of Classification Search
CPC ............. F05D 2260/30; F05D 2260/39; F01D 25/265; F16L 23/08; F16L 23/003; F16L 2201/60; F16B 2/08; F02M 35/10144
See application file for complete search history.

(56) References Cited

U.S. PATENT DOCUMENTS 5,411,162 A * 5/1995 Koziczkowski .......... C23C 4/00
                                                    220/320
5,549,449 A * 8/1996 McInerney ............. F01D 25/14
                                                    384/413
(Continued)

FOREIGN PATENT DOCUMENTS

JP    2006090526 A    4/2006
JP    2006118522 A    5/2006
(Continued)

OTHER PUBLICATIONS

Decision of Rejection dated Mar. 31, 2020 in corresponding JP Application No. 2018-507693, 13 pages.
(Continued)

*Primary Examiner* — Matthew R McMahon
(74) *Attorney, Agent, or Firm* — Venable LLP; Jeffri A. Kaminski

(57) ABSTRACT

A clamp for connecting a first component end to a second component end is provided. The clamp includes a web extending between a first end and a second end, each end being provided with a connecting device for connecting said web ends to each other so that the clamp encloses the component ends. The clamp further includes an alignment structure, which alignment structure is configured to fit with corresponding engagement structures provided at the first component end and the second component end for circumferentially positioning the clamp relative to the component ends.

10 Claims, 8 Drawing Sheets

(51) Int. Cl.
*F16L 23/08* (2006.01)
*F02C 6/12* (2006.01)
*F01D 25/24* (2006.01)
*F16B 2/08* (2006.01)
*F16L 23/00* (2006.01)
*F02B 37/00* (2006.01)

(52) U.S. Cl.
CPC ......... *F02M 35/10144* (2013.01); *F16B 2/08* (2013.01); *F16L 23/003* (2013.01); *F16L 23/08* (2013.01); *F02B 37/00* (2013.01); *F05D 2220/40* (2013.01); *F05D 2260/30* (2013.01); *F05D 2260/39* (2013.01); *F16L 2201/60* (2013.01)

(56) References Cited

U.S. PATENT DOCUMENTS

| | | | | |
|---|---|---|---|---|
| 6,062,610 | A * | 5/2000 | Andersson | F16L 23/08 285/367 |
| 6,439,619 | B1 | 8/2002 | Storage et al. | |
| 8,590,944 | B2 * | 11/2013 | Johnson | F16L 23/08 285/365 |
| 9,874,147 | B2 * | 1/2018 | Snape | F01D 25/28 |
| 10,190,537 | B2 * | 1/2019 | Scarr | F16B 2/08 |
| 2005/0099001 | A1 | 5/2005 | Cassel et al. | |
| 2011/0181037 | A1 | 7/2011 | Griffin et al. | |
| 2011/0248203 | A1 | 10/2011 | Goodman et al. | |
| 2011/0254268 | A1 | 10/2011 | Johnson et al. | |
| 2012/0207585 | A1 * | 8/2012 | Anderson | F04D 25/06 415/116 |
| 2012/0274063 | A1 | 11/2012 | Kennedy, Jr. | |

FOREIGN PATENT DOCUMENTS

JP   2009014111 A   1/2009
WO   2011071422 A1  6/2011

OTHER PUBLICATIONS

International Search Report (dated May 11, 2016) for corresponding International App. PCT/EP2015/070563.
Office Action dated Jul. 23, 2019 in corresponding Japanese Patent Application No. 2018-507693.

* cited by examiner

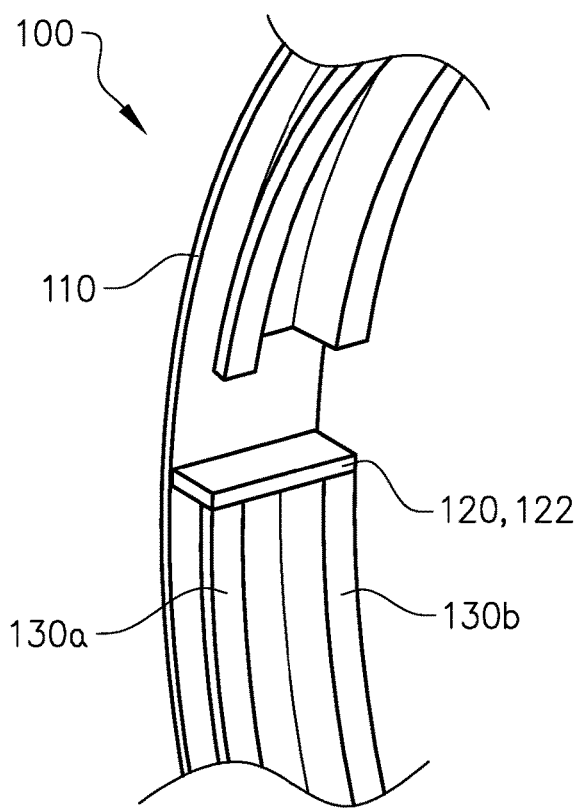
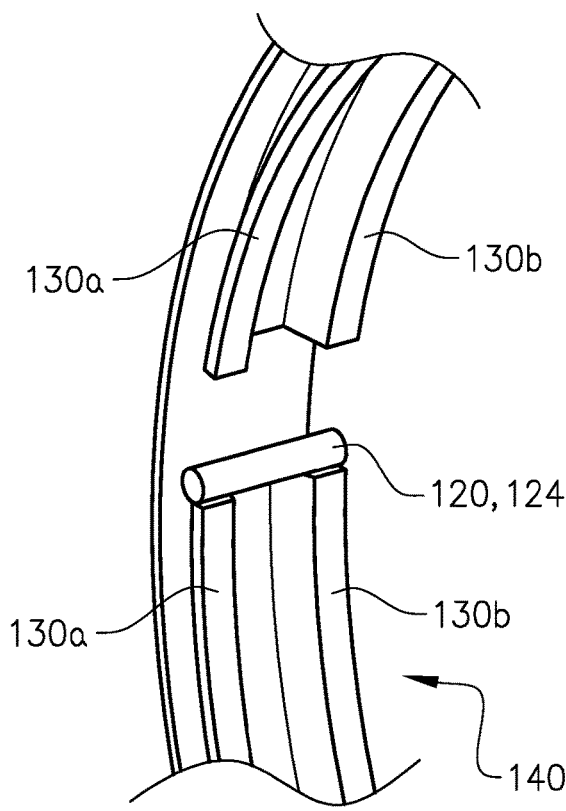
FIG. 6a
FIG. 6b
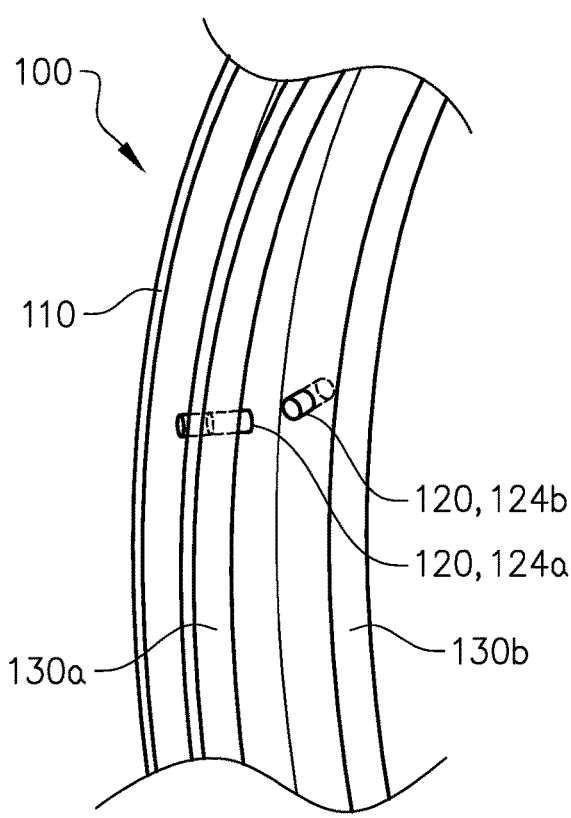
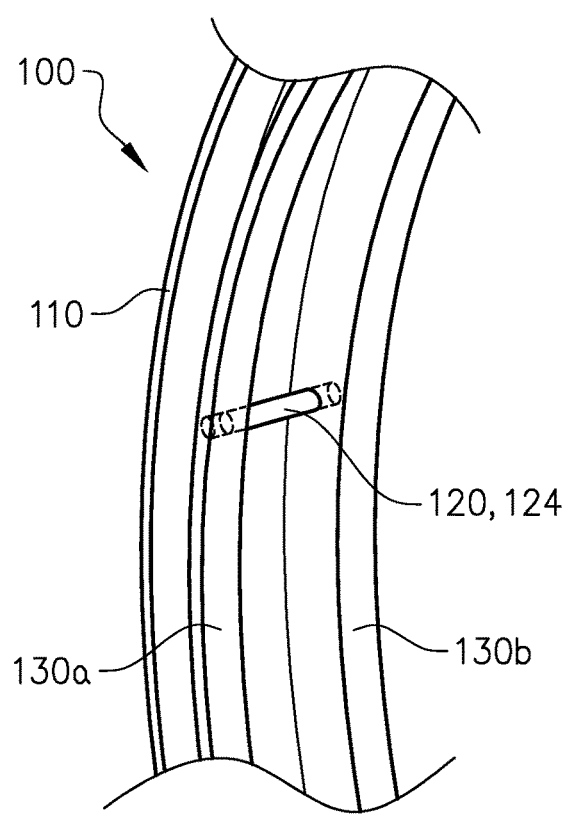
FIG. 6c
FIG. 6d

CLAMP

BACKGROUND AND SUMMARY

The invention relates to a clamp for connecting a first component end to a second component end.

The invention can be applied in a vast number of applications for which a clamping action is required to connect two component ends. One such application is when joining a compressor housing with a bearing housing of a turbocharger, and the clamp is thus particular useful for heavy-duty vehicles, such as trucks, buses and construction equipment. Although the invention will be described with respect to a truck, the invention is not restricted to this particular vehicle, but may also be used in other applications such as aero or marine systems, or any system for which two component ends are clamped together.

Clamps are widely used for connecting two open component ends to each other. One example is the so called V-band clamp, having two legs extending from a band, or web to form a V-shape. The ends of the web are provided with holes for receiving a bolt, and a nut is used to urge the two web ends towards each other. Hence the clamp forms a circular shape. While the clamp is not yet tightened it may be arranged around two flanges such that the legs of the clamp are arranged on each side of the flange connection. Upon tightening of the nut onto the bolt the diameter of the clamp will be reduced, thus providing a clamping effect to the flange connection.

A clamp according to the description above is known from e.g. U.S. Pat. No. 6,439,619, in which document the clamp is used for connecting two pipe flanges. Each flange is provided with a male/female structure for clocking the flanges relative each other.

Clocking of flanges is advantageous also in automotive applications, e.g. during assembly of a turbocharger in order to ensure that the housings are in correct angular position relative each other. Further, when mounting the engine it is desirable that the clamp bolt is always located at the same position.

It would thus be advantageous to provide an improved clamp that allows for facilitated mounting and dismounting.

It is desirable to provide a clamp overcoming the above mentioned drawbacks of prior art.

By providing the clamp with an alignment structure to fit with corresponding engagement structures on the component ends there will be a unique position for the clamp relative the component ends, thus ensuring that the clamp is always arranged in the intended rotational position. Hence, the clamp does not only provide clocking of the clamp relative the component ends, but also clocking of the component ends relative each other.

A clamp for connecting a first component end to a second component end is therefore provided. The clamp comprises a web extending between a first end and a second end, each end being provided with a connecting device for connecting said web ends to each other so that the clamp encloses the component ends. The clamp further comprises an alignment structure, which alignment structure is configured to fit with corresponding engagement structures provided at the first component end and the second component end for circumferentially positioning the clamp relative to the component ends.

In an embodiment the alignment structure is arranged approximately at an equal distance from said web ends. The tension acting on the web upon tightening of the clamp will thus be distributed evenly across the clamp.

In an embodiment the clamp comprises two spaced-apart legs extending radially inwards at a respective angle from said web. The legs thus forms a V-shape, which allows the clamp to be particularly advantageous for flange connections; while tightening the clamp there will be a radial, as well as axial force applied to the flanges.

In an embodiment the legs are distributed in two or more sections, each section extending circumferentially along the web and being spaced-apart from an adjacent section. By such spaced-apart sections there will be less risk of stick-slip between the clamp and the component ends.

In an embodiment the alignment structure is arranged at the end of one section. Hence, the space formed between two sections may be used to accommodate the alignment structure, making the entire clamp construction less complex.

In an embodiment the alignment structure comprises a tab extending between the two legs. The tab will thus occupy the entire distance between the legs which makes the alignment structure robust.

In an embodiment the tab is aligned with the axial direction of the clamp. The tab may be formed integrally with one of said legs, which simplifies manufacturing of the clamp.

In an embodiment the alignment structure comprises at least one pin extending between the two legs. The pin will thus occupy parts of, or the entire distance between the legs which makes the alignment structure robust.

In an embodiment the pin is aligned with the axial direction of the clamp. This allows the pin to engage with axial engagement structures of the component ends.

In an embodiment the alignment structure comprises at least one pin arranged between the two legs and extending radially inwards. The engagement structures of the component ends may thus be a simple hole, which facilitates manufacturing of the component ends.

In an embodiment the alignment structure comprises two pins arranged between the two legs and extending radially inwards, said two pins being aligned with axial direction of the clamp. The engagement structures of the component ends may thus be simple holes, which facilitates manufacturing of the component ends.

In an embodiment the alignment structure comprises a recess provided in the web at an axial position between the two legs. The recess may form a through hole in said web. Manufacturing of the clamp is thus made very simple, still allowing for the desired clocking functionality.

In an embodiment the connecting device of a first web end comprises a through hole for receiving a screw, and the connecting device of the second web end comprises a threaded through hole for engagement with said screw. Tightening of the clamp is thus made simple.

In an embodiment the clamp comprises a connection means arranged between the connecting device of the first web end and the connecting device of the second web end, which connection means is adapted for tightening the web around the component ends. Various connection means may thus be used, such that nuts/bolts, etc.

According to a second aspect a component assembly is provided. The component assembly comprises a first component having an open end, and a second component having a respective open end, and a clamp for connecting the open ends to each other. The clamp is in accordance with the first aspect presented above.

In an embodiment the component ends are flanges. Preferably, one open end comprises at least one engagement structure, while the other open end comprises one or more engagement structures. This allows for an accurate clocking of the open ends relative each other, especially when one of the open ends has a fixed position. Further, this also allows for accurate clocking in different fixed positions.

In an embodiment each engagement structure comprises a groove for receiving the alignment structure in the form of a tab or a pin. In another embodiment each engagement structure comprises a protrusion for engagement with the alignment structure in the form of a recess.

In one embodiment the first component is a turbine unit component, and said second component is another turbine unit component.

According to a third aspect a vehicle is provided, comprising a component assembly according to the second aspect presented above.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings:

FIG. 6b is a partial isometric view of a clamp according to an embodiment, FIG. 6c is a partial isometric view of a clamp according to an embodiment, FIG. 6d is a partial isometric view of a clamp according to an embodiment.

DETAILED DESCRIPTION

Figure 1:
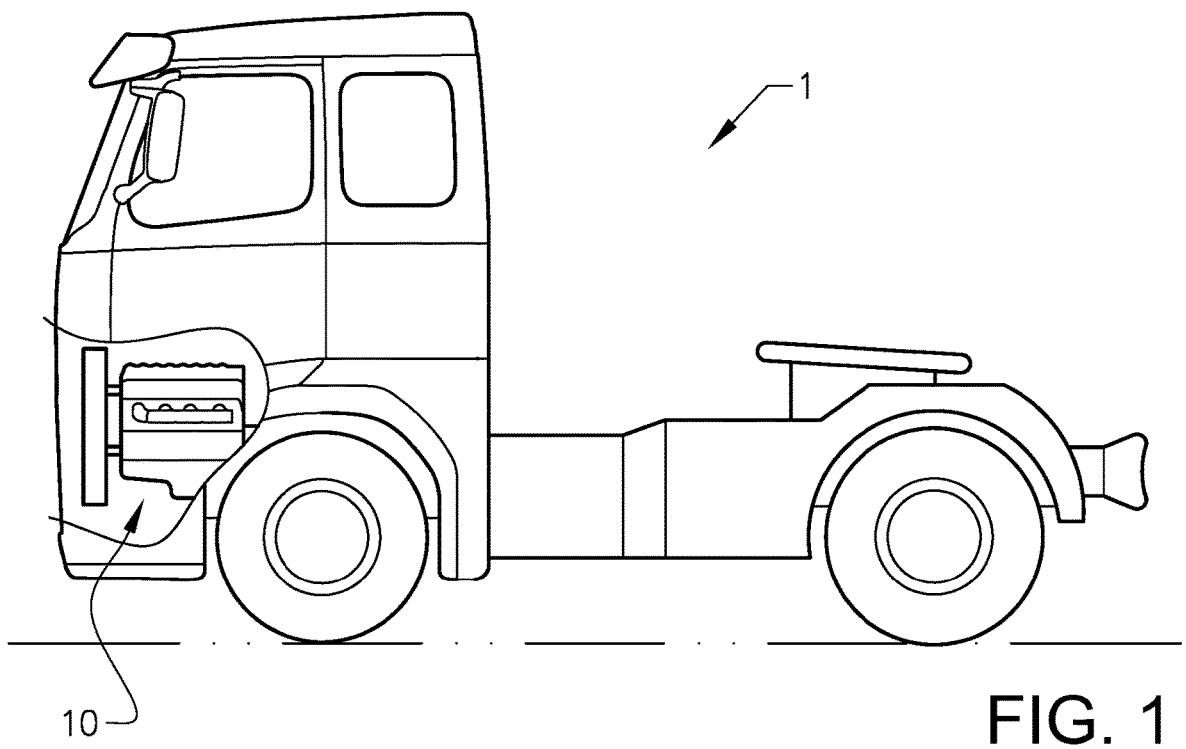
FIG. 1 is a side view of a vehicle according to an embodiment.

Starting with FIG. 1 a vehicle 1 is shown. The vehicle 1, which is illustrated as a truck, has an internal combustion engine 10 for driving the vehicle 1. As will be further explained below the internal combustion engine 10 of the vehicle 1 may be provided with various connections for joining two component ends to each other, e.g. connections of a turbocharger 50. Although the vehicle 1 is shown being a truck, it may also represent various vehicles such as buses, constructional equipment, etc.

Figure 2:
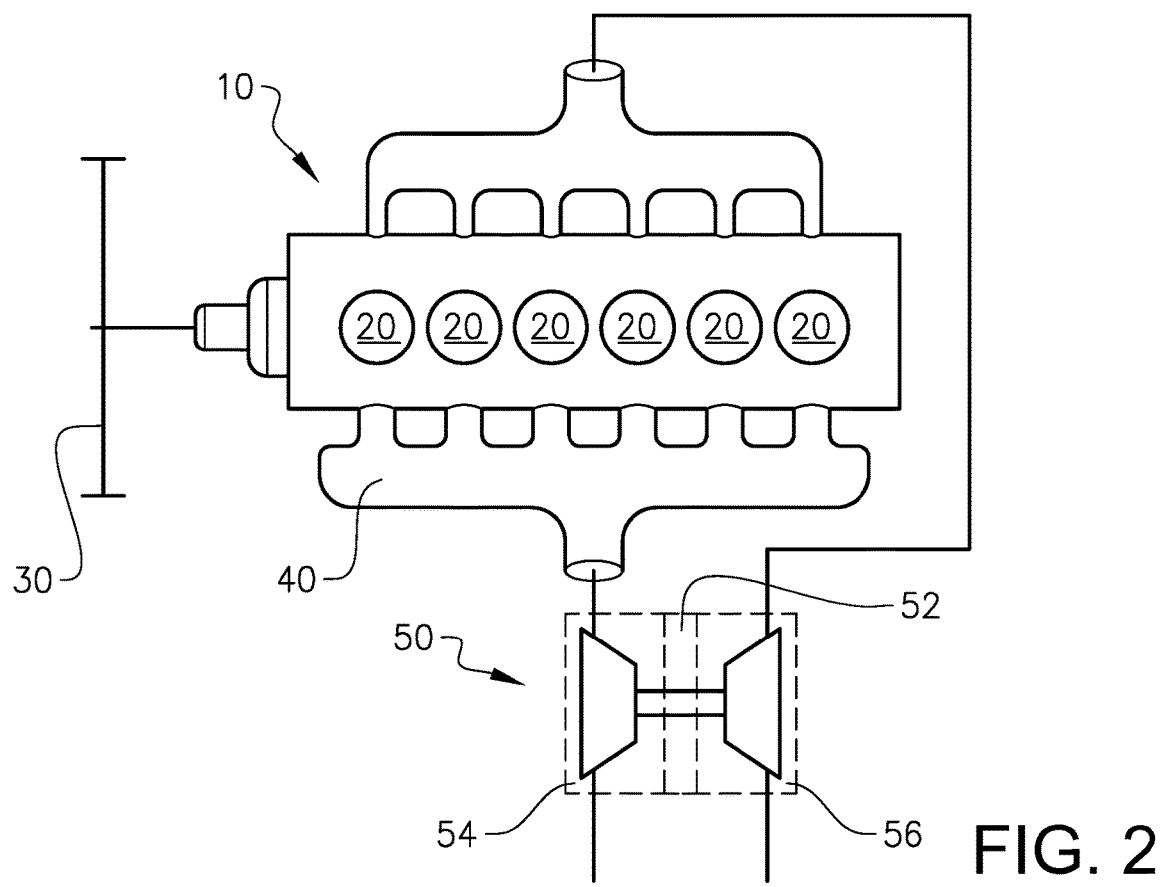
FIG. 2 is a schematic view of an internal combustion engine having a component assembly forming part of a turbine unit according to an embodiment.

In FIG. 2 an example of an internal combustion engine 10 is shown for which a clamp may be used. The internal combustion engine 10 includes a plurality of cylinders 20 operated to combust fuel, such as diesel or gasoline, whereby the motion of pistons reciprocating in the cylinders 20 is transmitted to a rotation movement of a crank shaft 30. The crank shaft 30 is further coupled to a transmission (not shown) for providing a torque to driving elements (not shown). In case of a heavy vehicle, such as a truck, the driving elements are wheels; however the internal combustion engine 10 may also be used for other equipment such as construction equipment, marine applications, etc.

The internal combustion engine 10 further comprises an exhaust gas system, which system serves the purpose of recovering at least some of the energy in the exhaust gas flow to improve the performance of the internal combustion engine 10. In the shown example the exhaust gas exits the cylinders 20 and enters an exhaust manifold 40 which is further connected to an exhaust inlet of a turbine housing 54 of a turbocharger 50. The exhaust gas flow will cause a turbine arranged inside the turbine housing 54 to rotate, which rotation is translated via a shaft to a corresponding rotation of a compressor arranged inside a compressor housing 56. The compressor is used to compress incoming air before it is introduced in the cylinders 20, and the compressor housing 56 is attached to a bearing housing 52, which in turn is connected to the turbine housing 45. The basic structural as well as functional specifications of a turbocharger 50 are well known in the art and will not be described in full details.

Figure 3:
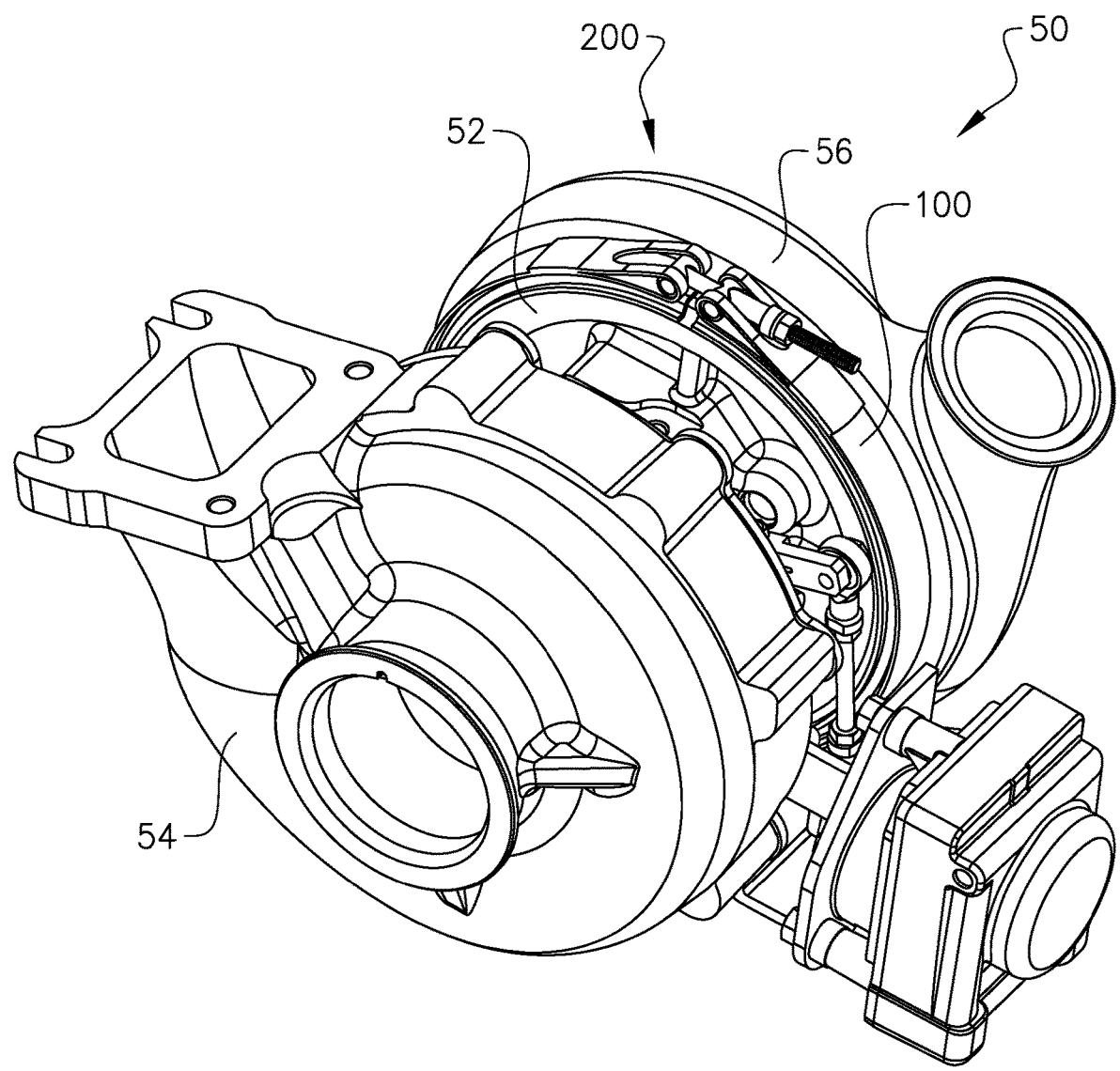
FIG. 3 is an isometric view of a turbine unit in the form of a turbocharger having a clamp according to an embodiment.

As can be seen in FIG. 3 the turbocharger 50 uses a clamp 100 for connecting the compressor housing 56 to the bearing housing 52. The bearing housing 52 has an open end to be connected with an open end of the compressor housing 56. Hence, the bearing housing 52, the compressor housing 56, and the clamp 100 together form a component assembly 200.

Figure 4:
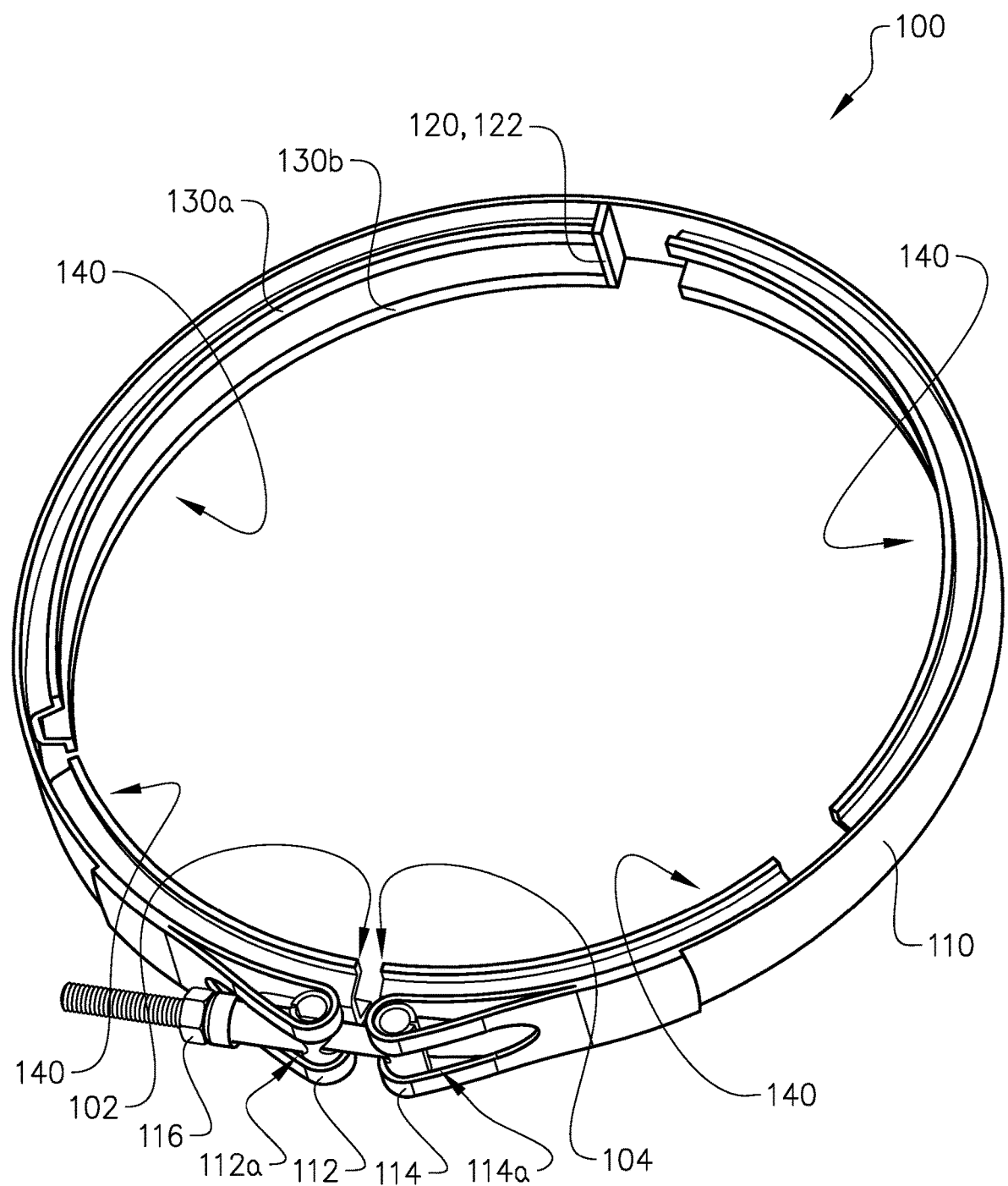
FIG. 4 is an isometric view of a clamp according to an embodiment.

The clamp 100 is shown in further details in FIG. 4. The clamp 100 is provided for connecting a first conduit end to a second conduit end; although the compressor housing 56 and the bearing housing 52 shown in FIG. 3 are not conduits in the sense that they are allowing a fluid flow there between, they nevertheless have open ends for connecting them with each other. The clamp 100 is very well suitable for connecting such open ended components, such as conduits or housings.

The clamp 100 comprises a web 110 extending between a first end 102 and a second end 104. Each end 102, 104 is provided with a connecting device 112, 114 for connecting said web ends 102, 104 to each other. Connection means 116, here in the form of a nut/screw engagement, is arranged between a through hole forming the connecting device 112 of the first web end 102 and a through hole forming the connecting device 114 of the second web end 104. The connection means 116 is thus adapted for tightening the web 110 around the open ends 52a, 56a of the conduits/housings 52, 56.

Optionally, the connecting device 112 of a first web end 102 comprises a through hole 112a for receiving a screw 116, and the connecting device 114 of the second web end 104 comprises a threaded through hole 114a for engagement with said screw 116. Other variants are possible; for example, the screw of the connection means 116 may be provided with a lever handle. In some embodiments the clamp comprises two or more parts, wherein the parts may be connected at each ends to form a circular clamp. In such embodiments multiple closures are required.

As is shown in FIG. 4 the web 110 comprises a continuous backing band extending along the periphery of the clamp 100. However, the backing band of the web 110 may in some embodiments be configured as two separate end pieces, each end piece being arranged to form the connection devices 112, 114.

When the two web ends 102, 104 are connected the clamp 100 will enclose the open ends 52a, 56a. The clamp has two spaced-apart legs 130a, 130b extending radially inwards at a respective angle from said web 110 such that the legs 130a, 130b forms a V-shape. Preferably, the legs 130a, 130b are distributed in two or more sections 140, wherein each section 140 extends circumferentially along the web 110 and being spaced-apart from an adjacent section 140. As can be seen in FIG. 4 there are three sections 140, although one section is split such that it extends over the connection means 116 and connection devices 112, 114. Each section 140 is approximately 120°, and they are distributed such that two sections 140 meet approximately 180° from the two web ends 102, 104. However, another number of sections 140 is possible as long as there is at least one section 140.

Referring back to the embodiment in which the backing band of the web 110 comprises separate end pieces, the continuous web 110 is formed by an intermediate portion being arranged between the two legs 130a, 130b. Hence, the intermediate portion of the web 110 and the legs 130a, 130b may be formed integrally by folding the legs 130a, 130b inwards.

The clamp 100 is further provided with an alignment structure 120. The alignment structure 120 is configured to fit with corresponding engagement structures 62, 66 (see e.g. FIG. 5a) provided at the first open end 52a and the second open end 56a. As will be understood from the following, the purpose of the alignment structure 120 is to provide clocking of the open ends 52a, 56a relative each other, as well as clocking of the clamp 100 relative the open ends 52a, 56a. That is, the alignment structure 120 allows for circumferentially positioning the clamp 100 relative to the open ends 52a, 56a.

As is clear from FIG. 4 the alignment structure 120 is arranged approximately at an equal distance from said web ends 102, 104. In fact, the alignment structure 120 is arranged at the end of one section 140 and it comprises a tab 122 extending between the two legs 130a, 130b. The tab 122 is preferably aligned with the axial direction of the clamp 100, such that it extends perpendicular to the direction of the legs 130a, 130b. In a preferred embodiment, the tab 122 is formed integrally with one of said legs 130b. The tab 122 may thus be formed by folding a portion of the leg 130b 90°, and welding the folded portion to the other leg 130a. Welding is preferably done on the outside of leg 130a, such that the weld joint is not affecting the dimensions of the tab during use.

Figure 5A:
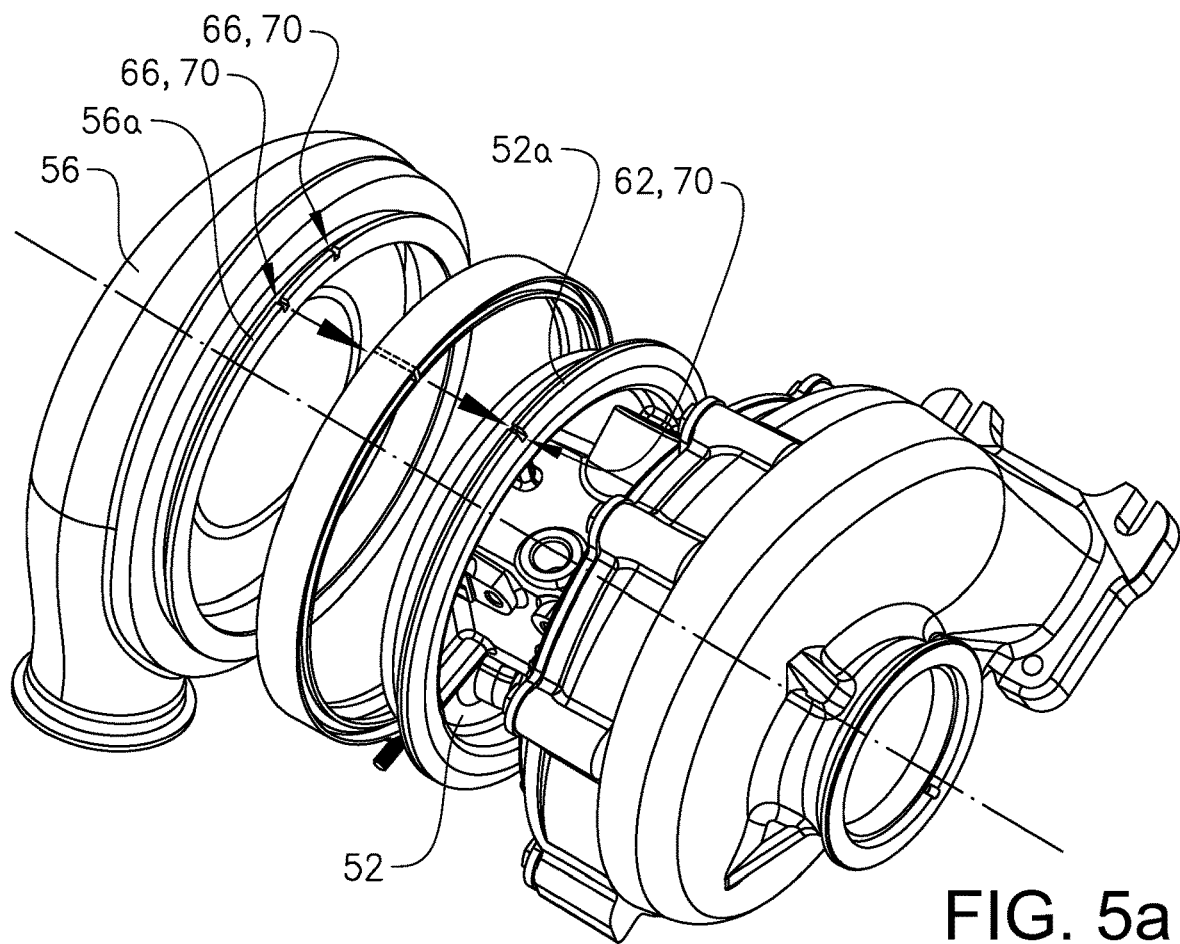
FIG. 5a is an exploded view of the turbocharger shown in FIG. 3.
Figure 5B:
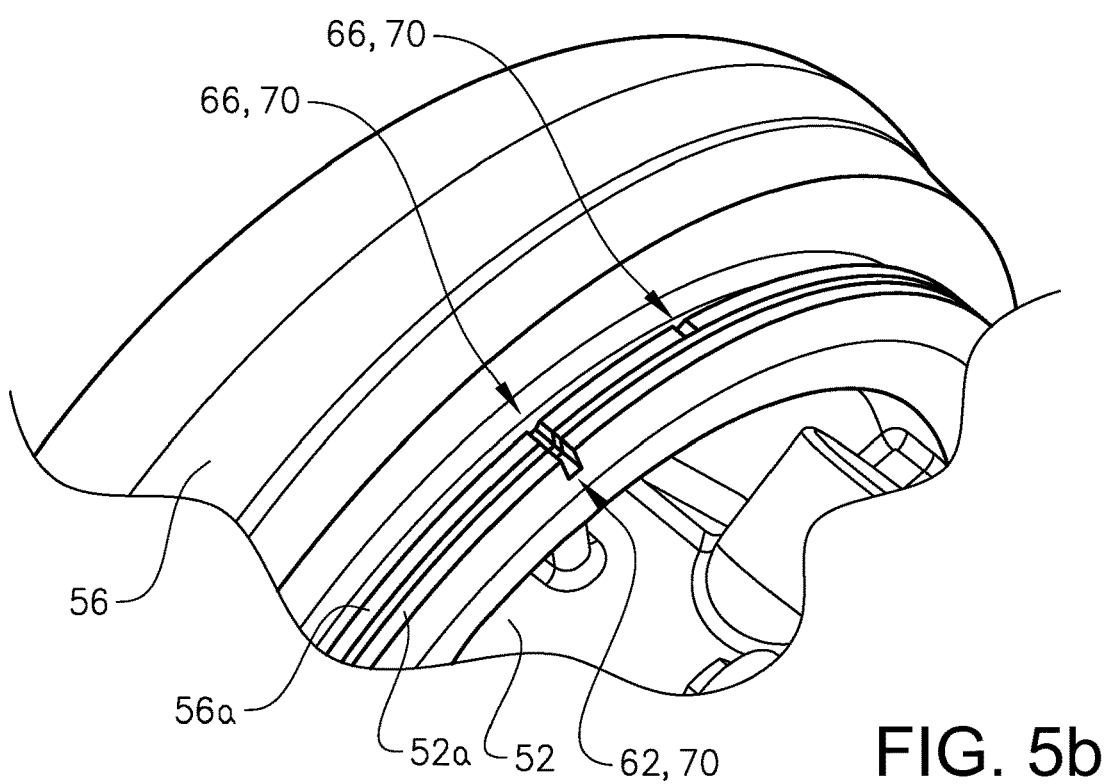
FIG. 5b is an enlarged view of the component ends shown in FIGS. 3 and 5a, FIG. 6a is a partial isometric view of a clamp according to an embodiment.

Now turning to FIGS. 5a and 5b, the use of the clamp 100 will be described in more details. As is shown in FIG. 5a the clamp 100 is used for connecting the flange 52a of the bearing housing 52 to the flange 56a of the compressor housing 56. The bearing housing 52, normally having a fixed position as it is attached to the engine via the turbine housing 54, has an open end 52a forming the flange. The flange 52a is provided with an engagement structure 62 in the form of a slit or groove 70. The compressor housing 56, which is to be attached to the bearing housing 52, has an open end 56a also forming a flange. The flange 56a of the compressor housing 56 is provided with one or more engagement structures 66 in the form of grooves 70.

Alignment of the engagement structures 62, 66 is required in order to mount the clamp 100 around the flanges 52a, 56a. When the groove 70 of the bearing housing flange 52a is in line with one of the grooves 70 of the compressor housing flange 56a the tab 122 will fit in the grooves 70, thus ensuring the position of the flanges 52a, 56a relative each other, as well as the position of the clamp 100 relative the flanges 52a, 56a.

The thickness of the flanges 52a, 56a is designed such that the legs 130a, 130b of the clamp 100 will engage both sides of the flange interface. As the legs 130a, 130b are tilted outwards, tightening the clamp 100 will urge the flanges 52a, 56a towards each other thus providing an axial force for a tight connection. However, due to the engagement of the tab 122 into the grooves 70 there will be no rotary displacement of the compressor housing 56 or the clamp 100 relative the bearing housing 52.

In FIG. 6a an embodiment of the clamp 100 is shown, wherein the alignment structure 120 is formed as the tab 122 extending across the space between the legs 130a, 130b. As previously described, the tab 122 may be provided by folding a portion of one of the legs 130a, 130b (or portions there between) and subsequently welding the tab 122 to the opposite leg 130a, 130b for ensuring the position of the tab 122.

In FIG. 6b a clamp 100 according to another embodiment is shown, wherein the alignment structure 120 is formed by a separate pin 124 being attached across the space between the legs 130a, 130b. The pin 124 is preferably extending in the axial direction of the clamp 100 such that it may fit with the engagement structures 62, 66 shown in FIGS. 5a and 5b.

In FIG. 6c a clamp 100 according to another embodiment is shown, wherein the alignment structure 120 is formed by two separate pins 124a, 124b. Each pin 124a, 124b is extending from a leg 130a, 130b and axially inwards into the space between the legs 130a, 130b. The pins 124a, 124b may be inserted into through-holes of the legs 130a, 130b, such that the pins 124 are arranged at a radial distance between the web 110 and the radial end of the legs 130a, 130b, optionally at an angle relative the axial direction of the clamp 100. The pins 124a, 124b are thus arranged such that each pin 124a, 124b may fit with an associated engagement structure 62, 66 of a component end as is shown in FIGS. 5a and 5b.

In FIG. 6d a clamp 100 according to another embodiment is shown, wherein the alignment structure 120 is formed by a separate pin 124 extending across the space between the legs 130a, 130b. The pin 124 may be inserted into through-holes of the legs 130a, 130b, such that the pin 124 is arranged at a radial distance between the web 110 and the radial end of the legs 130a, 130b. The pin 124 is preferably extending in the axial direction of the clamp 100 such that it may fit with the engagement structures 62, 66 shown in FIGS. 5a and 5b.

Figure 7:
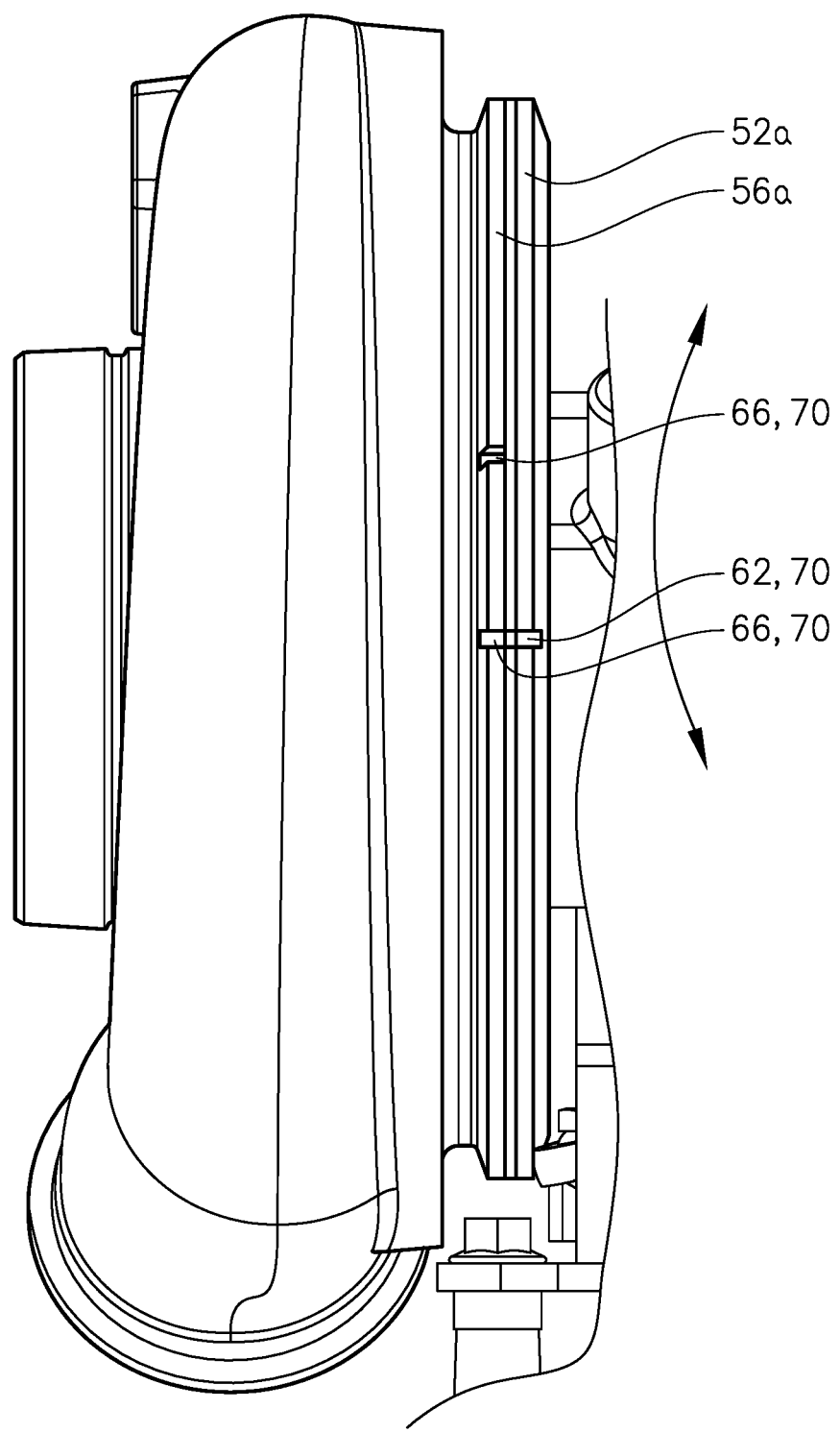
FIG. 7 is a top view of two component ends for use with the clamp shown in FIG. 6a or 6b.

In FIG. 7 a top view of the component assembly 200 is shown, however the clamp 100 is omitted. As can be clearly seen clocking of the flanges 52a, 56a is possible due to the provision of the engagement structures 62, 66. In fact, two different positions of the compressor housing 56 are possible, as either one of the grooves 70 may be used for engagement with the alignment structure 120 of the clamp 100.

Figure 8:
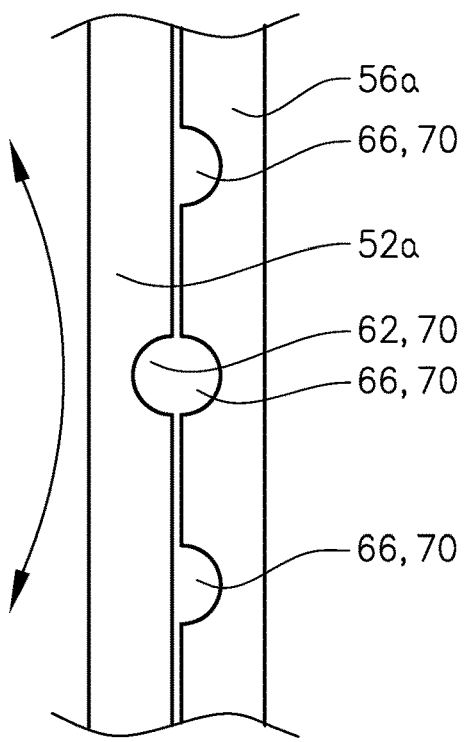
FIG. 8 is a top view of two component ends forming part of a component assembly according to an embodiment.
Figure 9:
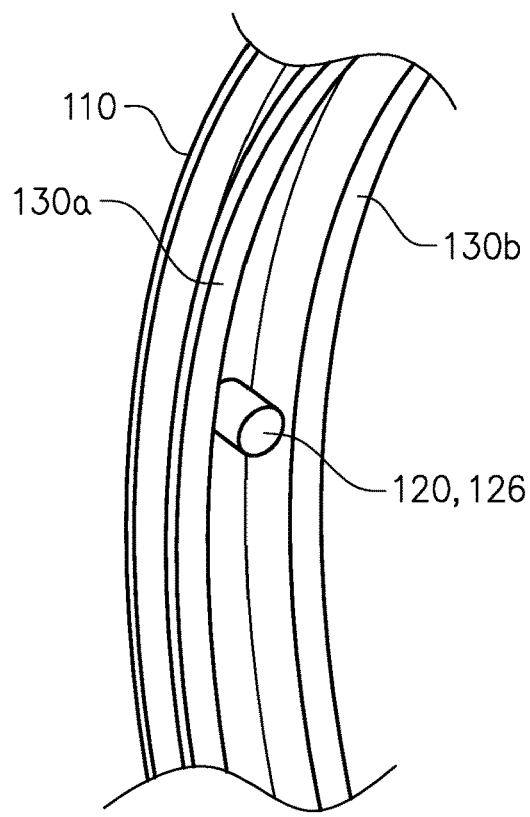
FIG. 9 is a partial isometric view of a clamp for use with the component ends shown in FIG. 8.

Another embodiment of a component assembly 200 is shown in FIGS. 8 and 9. While the alignment structure 120 of the clamp 100 is provided as a pin 126 extending radially inwards each flange 52a, 56a is provided with at least one recess 62, 66, 70 in the form of a half circle. When the flanges 52a, 56a are aligned relative each other the recesses 62, 66, 70 will together form a circular recess which may receive the pin 126 of the clamp 100.

Figure 10:
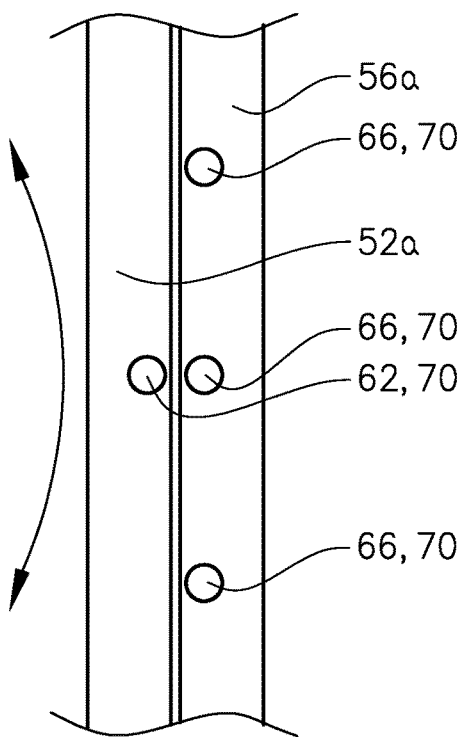
FIG. 10 is a top view of two open ends forming part of a component assembly according to an embodiment.
Figure 11:
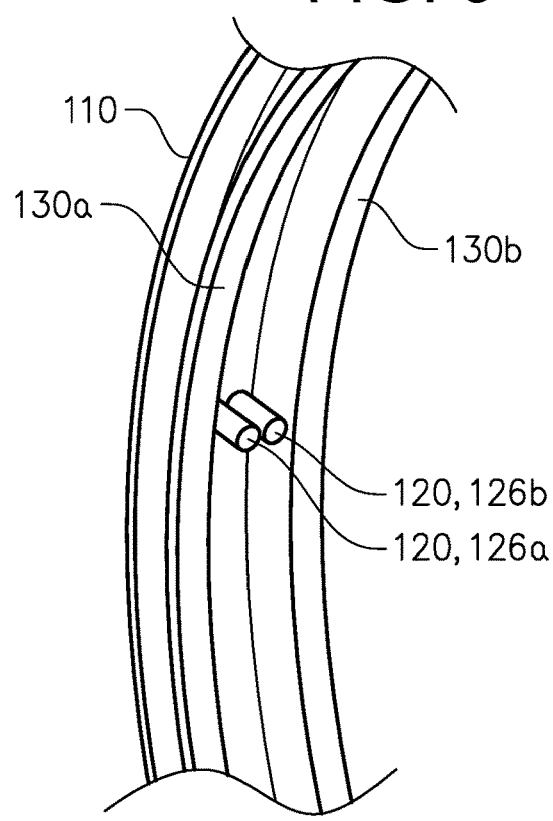
FIG. 11 is a partial isometric view of a clamp for use with the component ends shown in FIG. 10.

A yet further embodiment of a component assembly 200 is shown in FIGS. 10 and 11. The alignment structure 120 of the clamp 100 is provided as two pin 126a, 126b extending radially inwards and spaced apart in the axial direction. The two pins 126a, 126b are positioned axially between the two legs 130a, 130b of the clamp 100. Each flange 52a, 56a is provided with at least one recess 62, 66, 70 in the form of a circle. When the flanges 52a, 56a are aligned relative each other two aligned recesses 62, 66, 70, i.e. one recess 62, 66, 70 of each flange 52a, 56a will receive the pins 126a, 126b of the clamp 100.

Figure 12:
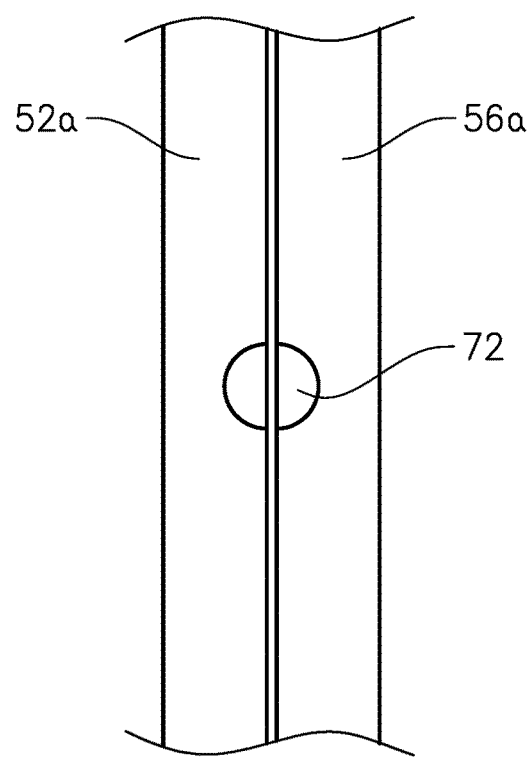
FIG. 12 is a top view of two component ends forming part of a component assembly according to an embodiment.
Figure 13:
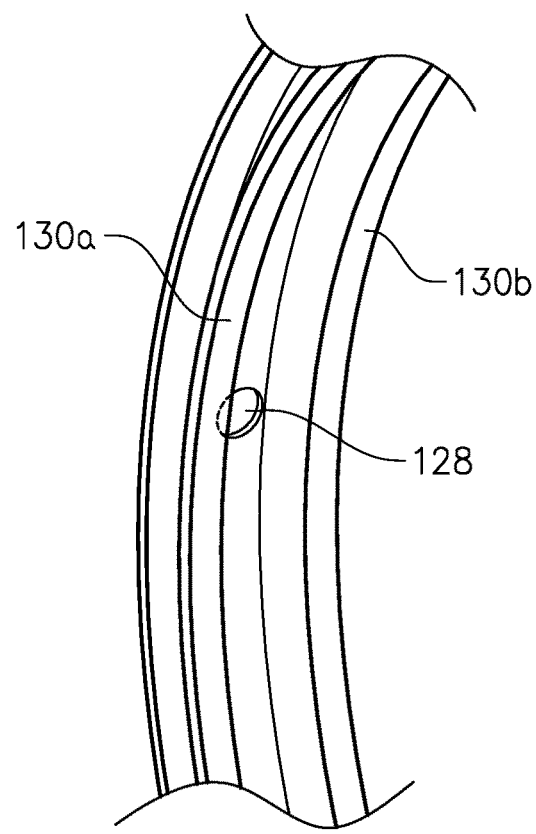
FIG. 13 is a partial isometric view of a clamp for use with the component ends shown in FIG. 12.

A still further embodiment of a component assembly 200 is shown in FIGS. 12 and 13. The alignment structure 120 of the clamp 100 is provided as a recess 128, or through-hole in the web axially between the two legs 130a, 130b. Each flange 52a, 56a is provided with at least one protrusion 72 in the form of a half circle. When the flanges 52a, 56a are aligned relative each other the protrusions 72 will together form a circular pin extending radially outwards, and which may be received in the through-hole or recess 128 of the clamp 100.

It is to be understood that the present invention is not limited to the embodiments described above and illustrated in the drawings; rather, the skilled person will recognize that many changes and modifications may be made within the scope of the appended claims.

The invention claimed is:

1. A component assembly comprising a first component having an open end flange, and a second component having a respective open end flange, and a clamp for connecting the open end flanges to each other, wherein the clamp comprises a web extending between a first end and a second end, each end being provided with a connecting device for connecting the web ends to each other so that the clamp encloses the open end flanges, two spaced-apart legs extending radially inwards at a respective angle from the web and an alignment structure comprising a tab extending between the two spaced-apart legs, the tab being formed in one piece with one of the legs and welded to the other of the two spaced-apart legs, which alignment structure is configured to fit with corresponding engagement structures provided at the first open end flange and the second open end flange for circumferentially positioning the clamp relative to the open end flanges, and wherein one open end flange comprises at least one engagement structure, while the other open end flange comprises two or more engagement structures, such that the open end flanges can be circumferentially positioned in different fixed positions in respect to each other.

2. The component assembly according to claim 1, wherein the alignment structure is arranged approximately at an equal distance from the web ends.

3. The component assembly according to claim 1, wherein the legs are distributed in two or more sections, each section extending circumferentially along the web and being spaced-apart from an adjacent section.

4. The component assembly according to claim 3, wherein the alignment structure is arranged at the end of one section.

5. The component assembly according to claim 1, wherein the tab is aligned with the axial direction of the clamp.

6. The component assembly according to claim 1, wherein the connecting device of a the first end of the web comprises a through hole for receiving a screw, and the connecting device of the second end of the web comprises a threaded through hole for engagement with the screw.

7. The component assembly according to claim 1, wherein the clamp comprises a connection means arranged between the connecting device of first end of the web and the connecting device of the second end of the web, which connection means is adapted for tightening the web around the open end flanges.

8. The component assembly according to claim 1, wherein each engagement structure comprises a groove for receiving the alignment structure in the form of a tab or a pin.

9. The component assembly according to claim 1, wherein the first component is a turbine unit component, and the second component is another turbine unit component.

10. A vehicle comprising a component assembly according to claim 1.

* * * * *